United States Patent [19]

Romi

[11] Patent Number: 5,476,347
[45] Date of Patent: Dec. 19, 1995

[54] DISPLACEABLE CUTTING TOOL SHANK HOLDER

[75] Inventor: Giordano Romi, Sta.Bárbara d'Oeste-SP, Brazil

[73] Assignee: Industrias Romi S/A, Sta. Barbara D'Oeste - SP, Brazil

[21] Appl. No.: 298,856

[22] Filed: Aug. 31, 1994

[30] Foreign Application Priority Data

Feb. 28, 1994 [BR] Brazil ............................ PI 9400542-7

[51] Int. Cl.$^6$ .................................................. B23B 29/00
[52] U.S. Cl. .......................................... 408/147; 408/238
[58] Field of Search .................................. 408/146, 147, 408/153, 158, 152, 174, 181, 238

[56] References Cited

U.S. PATENT DOCUMENTS

| | | | |
|---|---|---|---|
| 2,093,743 | 9/1937 | Steiner | 408/181 |
| 2,590,420 | 3/1952 | Lagher | 408/181 |
| 3,311,003 | 3/1967 | Daugherty | 408/152 |
| 3,730,636 | 5/1973 | Mizoguchi | 408/152 |
| 4,621,548 | 11/1986 | Kubo et al. | 408/158 |

*Primary Examiner*—Daniel W. Howell
*Attorney, Agent, or Firm*—Steinberg Raskin & Davidson

[57] ABSTRACT

A displaceable cutting tool shank holder, in particular for a rotary boring head threadable on a main spindle of a machine tool, having one end with a substantially H-shaped cross section provided with parallel linear tracks cooperating with linear tracks on internal projections in a member connected to the rotary boring head to thereby define guideways in which bearing balls on roller are situated. The projections are arranged on an end portion or top portion of the rotary boring head. An opposite end of the tool shank holder has a recess wherein a cutting tool shank is lodged.

19 Claims, 5 Drawing Sheets

DISPLACEABLE CUTTING TOOL SHANK HOLDER

BACKGROUND OF THE INVENTION

The present invention relates to a displaceable cutting tool shank holder and more specifically to a displaceable cutting tool shank holder for rotary boring heads.

Rotary boring heads that are fixed to the main spindle of machine tools provided with a displaceable tool shank holder and used for finishing high precision bores are already known. It is also known to provide rotary boring heads with movement means for displacing the tool holder, and thus the cutting tool/tool tip arranged thereon. These rotary boring heads operate perfectly when operating to finish short bores. However, the conventional construction presents several inconveniences and disadvantages when the operation consists of finishing deep bores, which require the use of a long length tool shank (above 2.5 times the diameter of the tool shank). For example, under these conditions, abnormal efforts are imposed on the tool shank thereby generating vibration and consequently, jeopardizing the deep bore finishing operation.

OBJECTS AND SUMMARY OF THE INVENTION

It is therefore an object of the present invention to provide a new and improved displaceable cutting tool shank holder capable of eliminating the inconvenience and disadvantage mentioned above.

It is another object of the present invention to provide a new and improved cutting tool shank holder for finishing deep bores in which the length of the tool shank is greater than about 2.5 times the diameter of the tool shank.

It is yet another object of the invention to provide a new and improved assembly of a tool shank holder and rotary boring head which substantially prevents vibration of the tool shank holder during bore finishing operations.

To achieve the objects stated above and others, briefly, in accordance with the invention, the tool shank holder is arranged to be perpendicularly displaceable in relation to the geometric axis of the rotary boring head that supports the tool shank holder. The tool shank holder is supported and guided by a plurality of guideways in which bearing balls or rollers are lodged.

The device in accordance with the invention is preferably used in combination with a rotary boring head threadable on a main spindle of a machine tool. The device comprises an elongate displaceable cutting tool shank holder having opposed first and second ends. The first end of the tool shank holder is substantially H-shaped in a cross section thereof while the second end comprises a recess for retaining a cutting tool shank onto which a tool tip is lodged. The device also includes a member arranged in proximity to the tool shank holder, and which may be a part of the rotary boring head when used therewith. The member and the tool shank holder have parallel linear tracks arranged in connection therewith and which are positioned relative to one another such that guideways are defined by the linear tracks between the tool shank holder and the member. To prevent vibration of the tool shank during bore finishing operations, roll means such as bearing balls or rollers are arranged in the guideways and enable displacement of the tool shank holder relative to the member.

The member may be arranged on an end portion or on a top portion of the rotary boring head and comprises an internal projection extending into each indented portion of the H-shaped tool shank holder so that the linear tracks are formed in connection with the projection. In view of its H-shape, the tool shank holder has a geometric axis whereby the linear tracks of the tool shank holder are thus arranged on both sides of the geometric axis. The internal projections are linear in a direction of displacement of the tool shank holder and opposite each other in relation to the geometric axis of the tool shank holder.

In a preferred embodiment, there are eight sets of linear tracks which define eight individual, separated guideways. A series of rolling bearing balls, or rollers, is arranged in each guideway. Four series of bearing balls define vertexes of an external quadrangle and another four series of bearing balls define vertexes of an internal quadrangle. The internal quadrangle is formed within the external quadrangle and is arranged closer to the geometric axis of the tool shank holder. The guideways which retain the series of balls forming the external quadrangle are defined by arc-shaped linear tracks whereas the guideways which retain the series of balls forming the internal quadrangle are defined by planar linear tracks.

In the following, the invention will be described in detail with reference to some exemplifying embodiments of the invention illustrated schematically in the figures in the accompanying drawings. However, the invention is by no means strictly confined to the details of these embodiments.

BRIEF DESCRIPTION OF THE DRAWINGS

The following drawings are illustrative of embodiments of the invention and are not meant to limit the scope of the invention as encompassed by the claims.

DETAILED DESCRIPTION OF THE INVENTION

Figure 1:
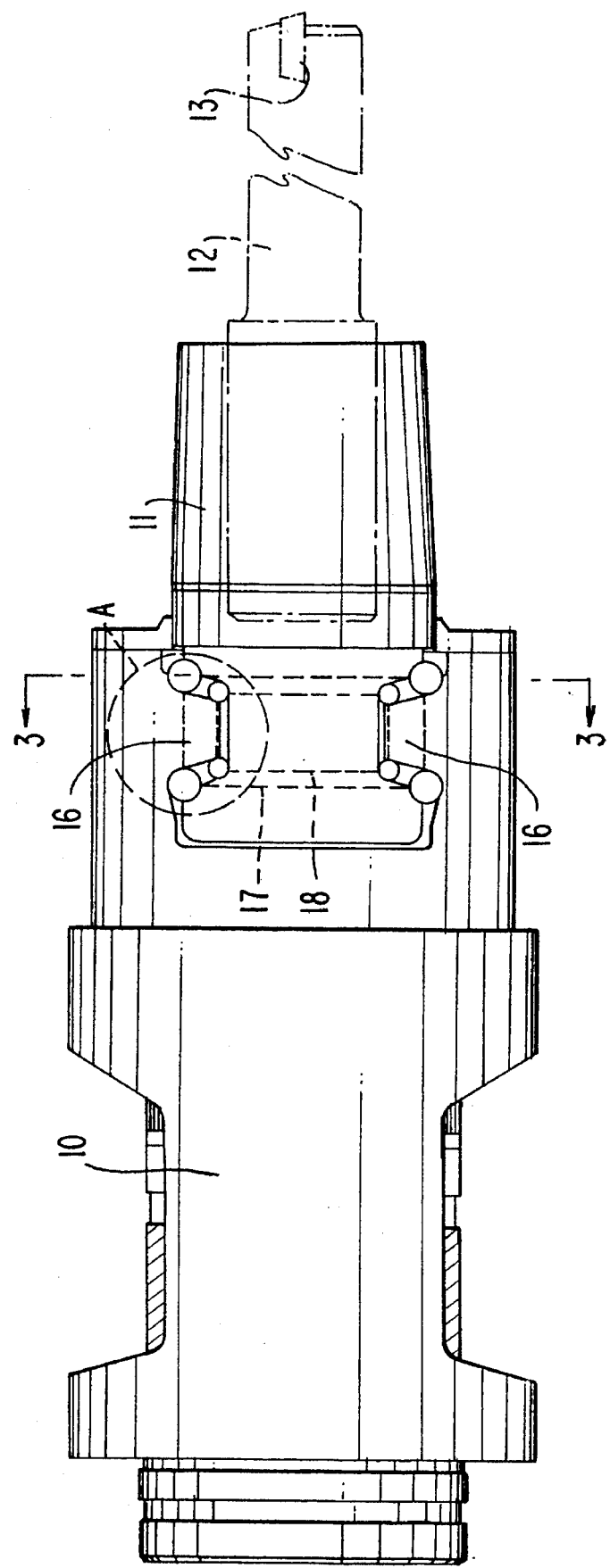
FIG. 1 is an elevational view of a rotary boring head incorporating the cutting tool shank holder in accordance with the invention.

Referring to the drawings, the device in accordance with the invention is used in conjunction with a rotary boring head 10 for finishing bores having a displaceable tool shank holder 11 which holds a cutting tool shank 12 at one end thereof. At an end of the tool shank 12, away from the tool shank holder 11, a hard metal tool tip 13 is fixed. The tool tip 13 engages the surface to be bored. An end of the tool shank holder 11, opposite the end to which the tool shank is held, is substantially shaped as an "H" (as shown most clearly in FIG. 1) and is intended for use on rotary boring head 10 where tool shank 12 has a long length, i.e., for boring deep bores. The "H"-shape of the end of the tool shank holder 11 is formed by a raised portion at an extreme end of the tool shank holder 11, followed by an indented portion and then a raised portion, which construction is present on both sides of a geometric axis (center line) of the tool shank holder 11.

Guide means are provided for guiding the tool shank holder 11 for movement in a linear direction. The guide means comprise linear guideways 14 consisting of rolling tracks lodging a plurality of bearing balls 15. The linear guideways 14 are defined by two opposed surfaces between which the bearing balls 15 are positioned. One surface is formed in part on the shank holder 11 itself and the other surface is internally built on top of the rotary boring head 10. By means of this construction, the bearing balls 15 enable free, unencumbered displacement without backlash of the shank holder 11 in relation to the top of rotary boring head 10 (thereby preventing vibration of the shank holder 11 during bore finishing operations). The top of the rotary boring head is provided with two internal linear projections 16. The other surface of the rolling tracks are built to form the anchoring base for the tool shank holder 11.

Preferably, the anchoring base for the shank holder 11 is provided with eight guideways 14 of which four are linear tracks having an arc of a circular cross section and the other four are linear tracks having a substantially planar cross section, i.e., formed in the vicinity of intersecting planar walls.

Preferably, the guideways 14 formed by the rolling tracks are arranged equidistant from each other in relation to the center line of the anchoring base provided by the projections 16 and the tool shank holder 11. In the embodiment illustrated in FIGS. 1–5, four guideways 14 are provided on one side of the center line and the other four guideways 14 are provided in the opposite side of the center line. Therefore, as shown in FIG. 1, bearing balls 15 are arranged according to the vertex of two quadrangles, i.e., an external quadrangle 17 and an internal quadrangle 18, formed by the guideways 14. The internal quadrangle 18 is closer to the geometric axis of the tool shank holder 11 and is formed within the external quadrangle 17.

In the embodiment illustrated in FIGS. 1–5, the external quadrangle 17 is provided with bearing balls 15 which roll in guideways 14 having an arc of circular cross section and which have a larger diameter than the bearing balls 15 of internal quadrangle 18 which roll on guideways 14 having a planar cross section. This construction is not restrictive since all bearing balls 15 may have the same diameter or may have a different diameter as illustrated. In a similar manner, with respect to the cross section of guideways 14 wherein bearing balls 15 roll, all of them may be in the shape of a circular arc or rectilinear or any other appropriate cross-sectional shape.

Figure 5:
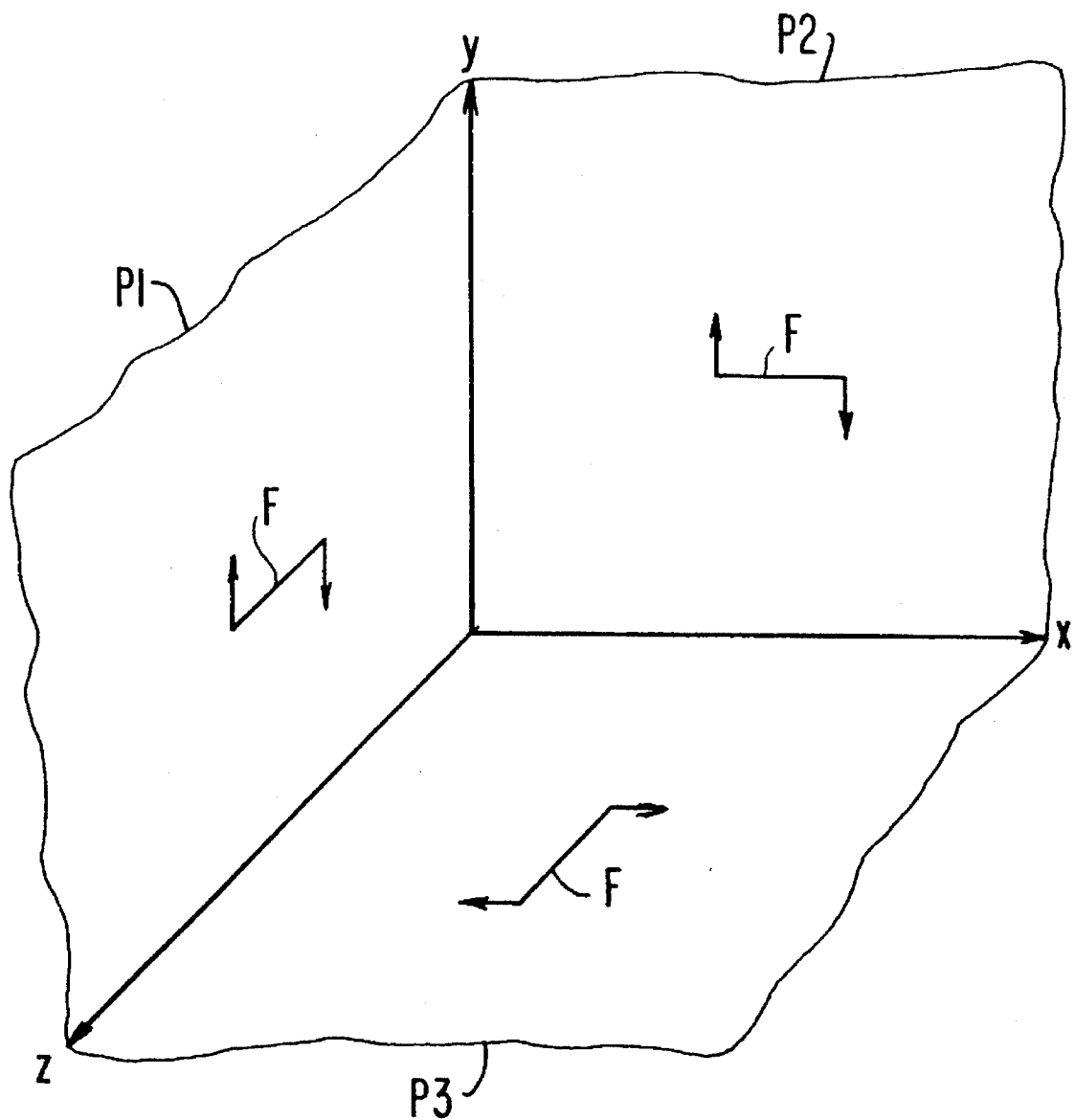
FIG. 5 is a perspective view showing binary forces actuating on three cartesian planes.

The purpose of the guideways 14 forming a rolling track for the bearing balls 15 is to form support means which provide maximum stability and steadiness for the tool shank holder 11 when it is subjected to bending and torsional forces during cutting operation. With reference to FIG. 5, these forces may actuate on a binary and/or in a radial sense or direction around 360° according to a cartesian plane P1 perpendicular to the geometric axis of rotary boring head 10.

Furthermore, the purpose of guideways 14 provided with bearing balls 15 located on the external quadrangle 17 is to absorb in a positive way, that is, to avoid any movement or displacement of the tool shank holder 11 due to forces actuating on a binary sense or direction according to a cartesian plane P2 perpendicular to the guideways 14 as shown in FIG. 5.

The forces actuating in a direction according to a binary sense or direction transmitted according to plane P3 parallel to the geometric axis of rotary boring head 10 and also parallel to the guideways 14 are thus absorbed by internal balls 15 located in the internal quadrangle 18.

Figure 2:
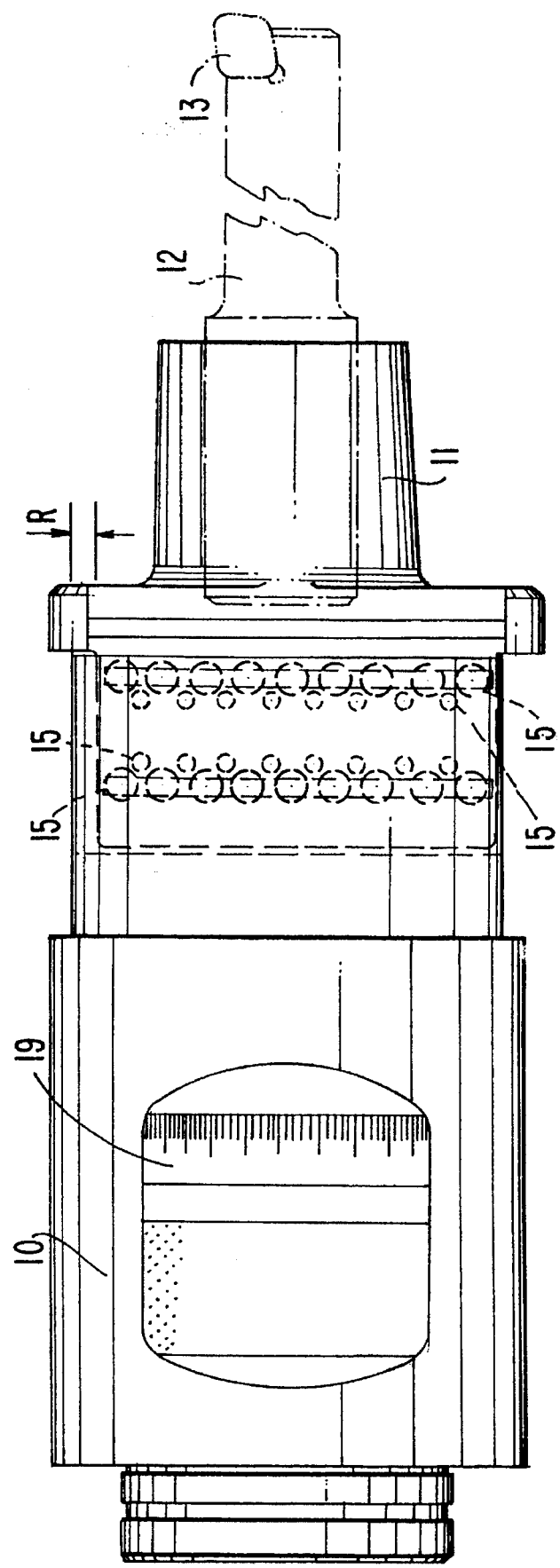
FIG. 2 is a lateral view of FIG. 1 showing a travelling length R of the device through its adjusting graduated drum.
Figure 4:
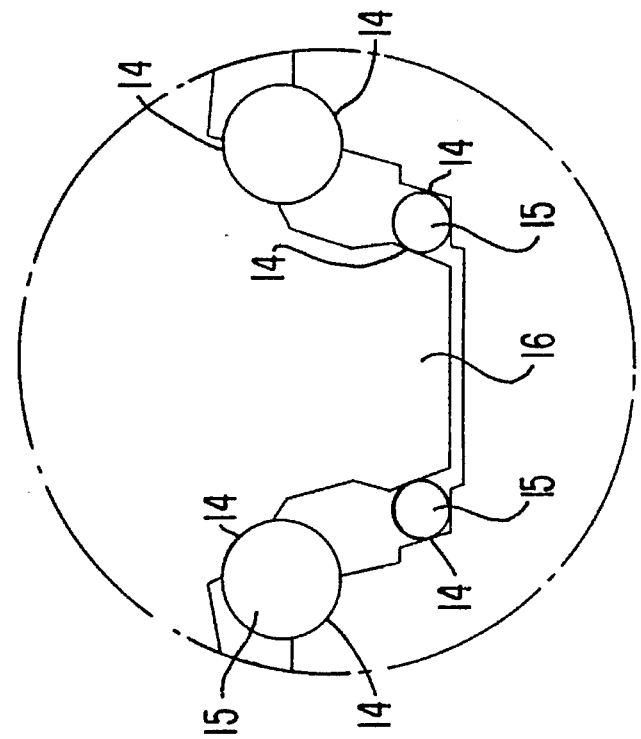
FIG. 4 illustrates enlarged detail A of FIG. 1.
Figure 3:
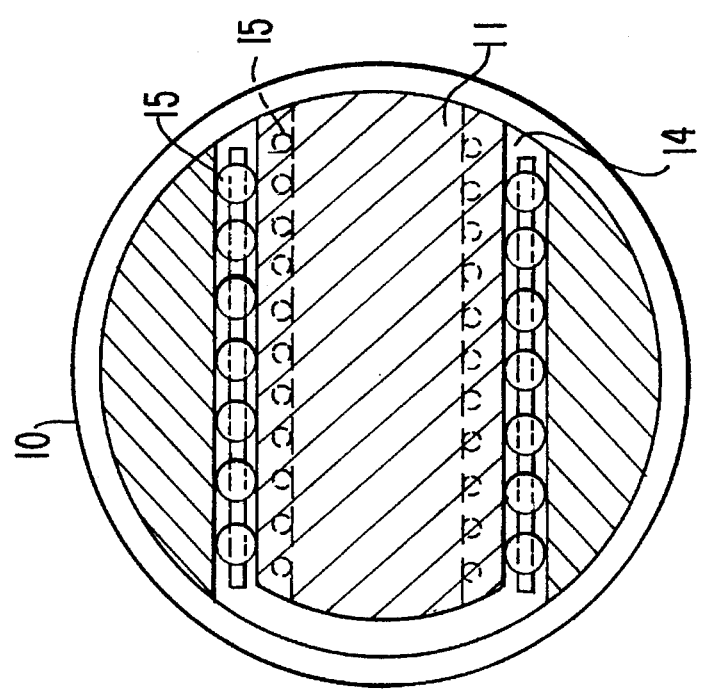
FIG. 3 is a sectional view taken along the line 3—3 of FIG. 1.

As shown in FIG. 2, the micrometric adjustment of the displacement of the cutting tool is obtained, i.e., controlled, through a graduated drum 19 having an adjustment travel or clearance R of a few millimeters of displacement allowing proper control for finishing high precision bores with extremely close tolerances in the order of less than one micron of a millimeter.

It should also be clear that a constructive modification may be considered as a constructive option, that is, section "H" of an end of tool shank holder 11 can become an "I" shape with projections 16 changing to recesses. Linear guideways will be formed between the recesses of the rotary boring head and the projecting top of the I-shaped end of the tool shank holder.

The present invention is, therefore, characterized by a construction in which any cutting tool forces are absorbed at any possible direction, i.e., tridimensionally, thereby substantially preventing any possible vibration to occur during bore finishing operations.

Figure 6:
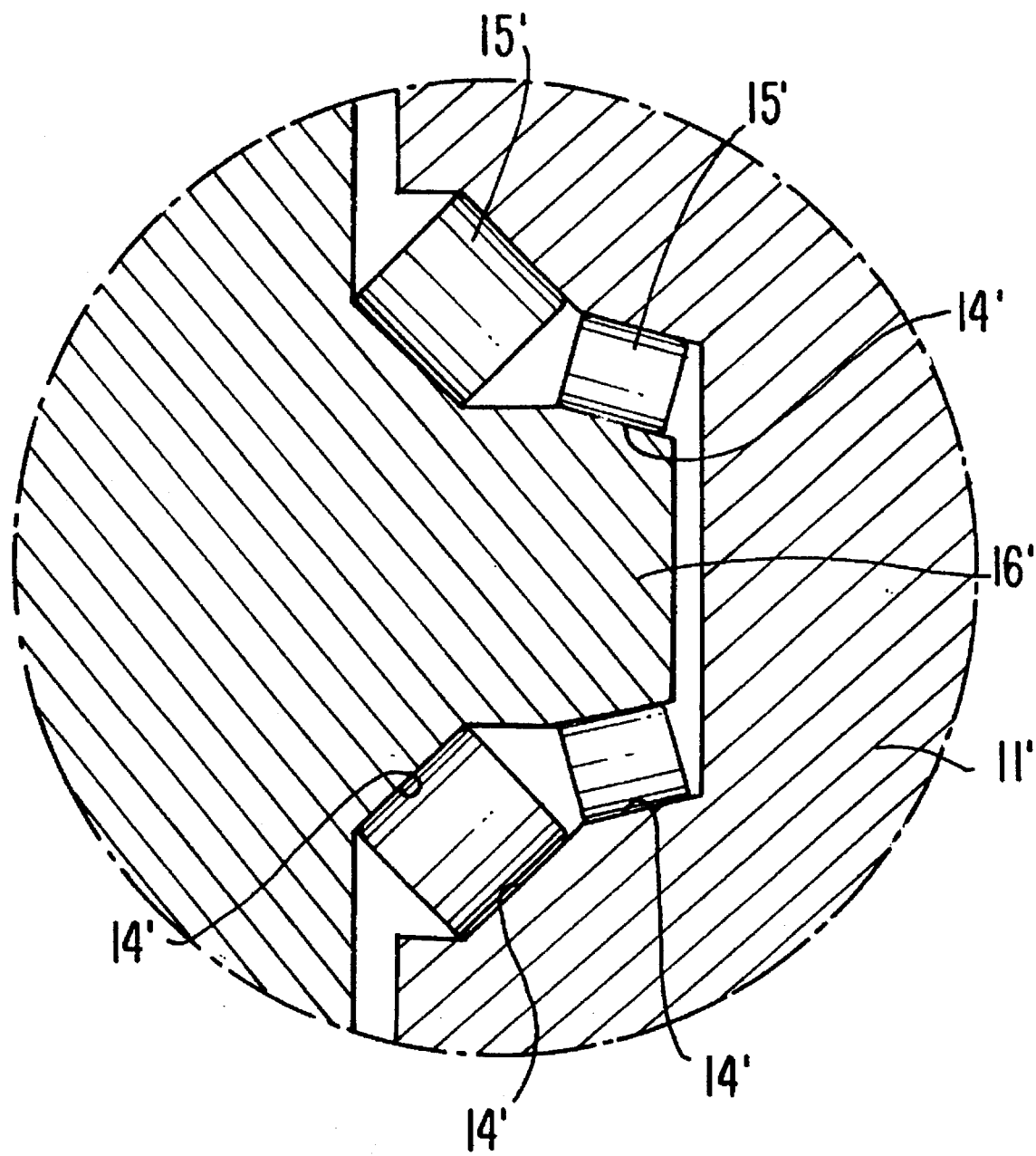
FIG. 6 is a second embodiment of the coupling between the tool shank holder and the rotary boring head in accordance with the invention.

In the embodiment illustrated in FIG. 6, instead of bearing balls, the guideways 14' lodge rollers 15' and in this case, the guideways 14' display a rectilinear cross-sectional shape which construction enables the same results to be obtained as when bearing balls are used. Thus, the projection 16' of the rotary boring head has planar surfaces aligned with planar surfaces of the tool shank holder 11' to define the guideways 14' in which suitable rollers 15' are positioned. The planar surfaces of the rollers 15' engage with the planar surfaces of both the projection 16' and the tool shank holder 11' to enable displacement of the tool shank holder 11' relative to the rotary boring head 16'.

The examples provided above are not meant to be exclusive. Many other variations of the present invention would be obvious to those skilled in the art, and are contemplated to be within the scope of the appended claims.

I claim:

1. An assembly for use with a rotary boring head attachable to a main spindle of a machine tool, comprising an elongate displaceable cutting tool shank holder having opposed first and second ends, said first end having a substantially H-shaped cross sectional shape, said second end comprising a recess for retaining a cutting tool shank, a member arranged in proximity to said tool shank holder, said member and said tool shank holder having parallel linear tracks arranged in connection therewith and being positioned relative to one another such that guideways are defined by said linear tracks between said tool shank holder and said member, and means arranged in said guideways for enabling the displacement of said tool shank holder relative to said member.

2. The assembly of claim 1, wherein said tool shank holder has indented portions on opposite sides thereof, said member comprising an internal projection extending into each of said indented portions of said tool shank holder, said linear tracks being formed in connection with said projections.

3. The assembly of claim 1, wherein said tool shank holder has a geometric axis, said linear tracks of said tool shank holder being arranged on both sides of the geometric axis.

4. The assembly of claim 1, wherein at least some of said linear tracks are arc-shaped.

5. The assembly of claim 1, wherein at least some of said linear tracks comprise intersecting planar walls.

6. The assembly of claim 2, wherein said internal projections are linear in a direction of displacement of said tool shank holder and opposite to each other in relation to a geometric axis of said tool shank holder.

7. The assembly of claim 1, further comprising eight sets of said linear tracks which define eight of said guideways, said means comprising a series of rolling bearing balls arranged in each of said guideways.

8. The assembly of claim 7, wherein four of said series of bearing balls define vertexes of an external quadrangle and another four of said series of bearing balls define vertexes of an internal quadrangle, wherein said internal quadrangle is formed within said external quadrangle and arranged closer to a geometric axis of said tool shank holder.

9. The assembly of claim 7, wherein at least some of said linear tracks are arc-shaped and have a circular cross section.

10. The assembly of claim 7, wherein at least some of said linear tracks have a planar cross section.

11. The assembly of claim 1, wherein said means comprise rollers.

12. The assembly of claim 1, wherein said H-shaped first end of said tool shank holder comprises a pair of raised portions and an indented portion arranged therebetween on both sides of a geometric axis of said tool shank holder.

13. The assembly of claim 8, wherein said linear tracks are arc-shaped or planar, said guideways which retain said series of balls forming said external quadrangle being defined by arc-shaped ones of said linear tracks and said guideways which retain said series of balls forming said internal quadrangle being defined by planar ones of said linear tracks.

14. The assembly of claim 1, wherein said member is arranged on an end portion or on a top portion of the rotary boring head.

15. A rotary boring head for finishing bores, comprising an elongate displaceable cutting tool shank holder having opposed first and second ends, said first end having a substantially H-shaped cross sectional shape comprising a pair of raised portions and an indented portion arranged therebetween on both sides of a geometric axis of said H-shaped first end, said second end having a recess therein, a cutting tool shank for retaining a tool tip, said tool shank being lodged in said recess of said tool shank holder, a member arranged in the boring head and having projections extending into said indented portions of said H-shaped first end of said cutting tool shank, said projections on said member and said indented portions of said tool shank holder having parallel linear tracks arranged in connection therewith and being positioned relative to one another such that guideways are defined by said linear tracks between said tool shank holder and said member, and means arranged in said guideways for enabling the displacement of said tool shank holder relative to said member.

16. The boring head of claim 15, wherein said member is arranged on an end portion or on a top portion of the rotary boring head.

17. The boring head of claim 15, wherein said means comprise bearing balls.

18. The boring head of claim 15, further comprising a graduated drum for controlling the displacement of said tool shank holder relative to said member.

19. The boring head of claim 15, wherein said linear tracks are planar and said means comprise rollers having planar surfaces engaging with said planar linear tracks.

* * * * *